UNITED STATES PATENT OFFICE 1,994,891

MOTOR FUEL

Clifford G. Ludeman, Fishkill, N. Y., assignor to The Texas Company, New York, N. Y., a corporation of Delaware No Drawing. Application October 3, 1932, Serial No. 636,032

17 Claims. (Cl. 44—9)

This invention relates to motor fuels and more particularly to the provision of a gum inhibitor or antioxidant in a motor fuel, such as cracked gasoline, to suppress gum formation and to prevent discoloration and loss in anti-knock property.

Light hydrocarbon oils, such as gasolines, naphthas, and kerosenes and other untreated distillates produced in commercial cracking operations, usually contain unstable, unsaturated constituents which tend to form gummy or resinous substances on standing. The presence of gum in motor fuels may not only interfere with the useful operation of an internal combustion engine but also the merchantability and general utility of the fuel may be substantially impaired due to deterioration in color and anti-knock properties. The general practice, therefore, is to subject cracked oils to certain refining operations in order to render the unsaturated hydrocarbons less objectionable. One method comprises adding to the oil to be treated certain materials of the nature of anticatalysts which function, in a manner not wholly understood, to prevent reactions tending to form gum, and thereby stabilize the otherwise unstable constituents of the oil.

Antioxidants or gum inhibitors, as these anticatalysts are known in the art, have been used heretofore to suppress or to prevent gum-forming reactions and many compounds of varying efficiencies have been proposed in the prior art for this purpose. The polyhydric phenols or polyhydroxy benzenes have been found to be relatively effective inhibitors, but these compounds have certain disadvantages. The isomeric di- and trihydric phenols, comprising pyrocatechol, resorcinol, hydroquinone, pyrogallol, phloroglucinol, and 1, 2, 4 trihydroxy benzene, which are the most common representatives of these classes, are only slightly soluble in gasoline, but even the small amount in the solutions thereof often produce objectional reaction products, such as sludge, under certain conditions of use or on prolonged exposure to the atmosphere. Also, these materials are quite soluble in water and inasmuch as gasolines often come in contact with substantial quantities of water, the inhibitors in this way may be almost completely removed from the gasoline or their efficiency materially impaired. An important object of the present invention, therefore, is to provide a derivative of the polyhydroxy benzenes which will be free from such disadvantages.

In accordance with the present invention, I convert the polyhydroxy benzenes into compounds, which are useful as inhibitors, comprising a naphthenic acid derivative of a polyhydroxy benzene. These substances may be prepared according to methods disclosed in the literature for making acyl derivatives of benzenoid compounds of this type. A convenient method is to react a polyhydroxy benzene, under proper conditions, with naphthenyl chloride, with or without the use of a solvent. Another method is to heat a polyhydric phenol with naphthenic acids in the presence of a suitable catalyst, such as zinc chloride, with or without a solvent.

The compounds so produced have the characteristics of naphthenyl derivatives and are believed to have a naphthenyl radical substituted on the benzene ring of the original polyhydric phenol molecule. Their physical properties may range from solids to heavy liquids, depending on their composition. They are readily soluble in gasoline, practically insoluble in water, relatively stable, and function as efficient inhibitors when dissolved in gasoline.

The following example will illustrate the nature of my invention, but the invention is not restricted to this example.

A sample of purified naphthenic acids separated from South Texas petroleum and having a boiling range of 187° F.–400° F. at 29 inches of mercury, a saponification value of 179.3, a molecular weight of 312.9 and a refractive index by daylight at 25° C. of 1.50185 was converted into the corresponding acid chlorides. A derivative of pyrogallol was prepared by reacting pyrogallol with the naphthenyl chlorides. The resulting product, without extensive purification, was a brown plastic material having characteristics corresponding to 4-naphthenyl pyrogallol. About .01% of this material was dissolved in a cracked gasoline showing about 200 mg. of gum per 100 cc. by the copper dish method. The treated sample showed about 10 mg. per 100 cc. by the same method.

The copper dish method employed is that described as Method 530.1, Technical Paper 323–B of the Bureau of Mines.

The amount of gum inhibitor used above is merely illustrative and a different amount of the same or other inhibitors may be suitable for other gasolines. In general, about 0.001% to 0.1% is satisfactory for most oils and preferably an amount in the region of about 0.005% to 0.025% by weight.

The inhibitors are usually readily soluble but in some cases it may be advantageous to use a mutual solvent to expedite the dissolution thereof in the gasoline, and accordingly the invention contemplates the use of solvents such as acetone, benzol, alcohol, etc. or mixtures thereof in which the inhibitor may be first dissolved, and then the resulting solution added to the gasoline to be treated.

It is to be understood that the naphthenic acids used in the preparation of my inhibitors are saturated carbocyclic carboxylic acids and may be mono- or polycyclic.

By the term "naphthenyl" as used in the specification, I mean the acyl radical of a naphthenic acid, regardless of the type of ring structure.

Obviously, many modifications and variations of the invention, as hereinbefore set forth, may be made without departing from the spirit and scope thereof, and therefore only such limitations should be imposed as are indicated in the appended claims.

I claim:

1. The method of treating cracked gasolines and the like, normally tending to form gum or become discolored on storage, which comprises adding to the gasoline a small amount of a naphthenyl derivative of a polyhydroxy benzene.

2. The method of treating cracked gasolines and the like, normally tending to form gum or become discolored on storage, which comprises adding to the gasoline a small amount of a naphthenyl derivative of a trihydroxy benzene.

3. The method of treating cracked gasolines and the like, normally tending to form gum or become discolored on storage, which comprises adding to the gasoline a small amount of a naphthenyl derivative of pyrogallol.

4. The method according to claim 3 in which the naphthenyl radical is in the 4 position on the benzene ring of pyrogallol.

5. A composition of matter comprising cracked gasoline and the like, normally tending to form gum or become discolored on storage, and a small amount of a naphthenyl derivative of a polyhydroxy benzene.

6. A motor fuel consisting essentially of a cracked gasoline and the like, normally tending to form gum or become discolored on storage, and containing a small amount of a naphthenyl derivative of a trihydroxy benzene.

7. A cracked gasoline and the like, normally tending to form gum or become discolored on storage, containing the reaction product between a polyhydroxy benzene and naphthenic acids, said product having the characteristics of acyl compounds.

8. A cracked gasoline and the like, normally tending to form gum or become discolored on storage, containing a small amount of a reaction product between gyrogallol and naphthenic acids, said product having the characteristics of 4-naphthenyl pyrogallol.

9. The method of treating cracked gasolines and the like, normally tending to form gum or become discolored on storage, which comprises incorporating in the gasoline a small amount of a naphthenyl derivative of a dihydroxy benzene.

10. The method of treating cracked gasolines and the like, normally tending to form gum or become discolored on storage, which comprises adding to the gasoline a small amount of a naphthenyl derivative of catechol.

11. The method of treating cracked gasolines and the like, normally tending to form gum or become discolored on storage, which comprises adding to the gasoline a small amount of a naphthenyl derivative of hydroquinone.

12. A composition of matter according to claim 6 in which the trihydroxy benzene is pyrogallol.

13. A composition of matter comprising cracked gasoline and the like, normally tending to form gum or become discolored on storage, and a small amount of a naphthenyl derivative of a dihydroxy benzene.

14. A composition of matter according to claim 13 in which the dihydroxy benzene is hydroquinone.

15. A composition of matter according to claim 13 in which the dihydroxy benzene is catechol.

16. The method of treating cracked petroleum distillates, normally tending to deteriorate and form gum on storage, which comprises incorporating into the distillate about 0.001 to 0.1% of a naphthenyl derivative of pyrogallol.

17. A cracked petroleum distillate, normally tending to deteriorate and form gum on storage, and containing about 0.001 to 0.1% of a naphthenyl pyrogallol compound.

CLIFFORD G. LUDEMAN.